United States Patent [19]

Sato

[11] 4,379,800
[45] Apr. 12, 1983

[54] CLEANING TAPE FOR MAGNETIC RECORDING APPARATUS

[75] Inventor: Nobuhiro Sato, Tokyo, Japan

[73] Assignee: TDK Electronics Co., Ltd., Tokyo, Japan

[21] Appl. No.: 374,098

[22] Filed: May 3, 1982

Related U.S. Application Data

[63] Continuation-in-part of Ser. No. 274,740, Jun. 18, 1981, abandoned.

[30] Foreign Application Priority Data

Jun. 20, 1980 [JP] Japan ................................ 55-83660

[51] Int. Cl.³ .......................... B05D 5/12; D06N 7/04
[52] U.S. Cl. .................................. 428/148; 427/130;
428/425.9; 428/694; 428/697; 428/698;
428/702; 428/900
[58] Field of Search ..................... 428/148, 425.9, 694,
428/697, 698, 702, 900; 427/130

Primary Examiner—Bernard D. Pianalto
Attorney, Agent, or Firm—Oblon, Fisher, Spivak, McClelland & Maier

[57] ABSTRACT

A cleaning tape for a magnetic recording apparatus comprises a substrate coated with a cleaning layer comprising magnetic iron oxide power as a main component and a non-magnetic abrasive power having Moh's scale of hardness of at least 6 and a binder wherein said cleaning layer has a surface roughness of 0.5 to 5 μm and a ratio of said abrasive powder to iron oxide powder of 0.3 to 40 wt. % and especially 3 to 40 wt. % in the case of said surface roughness of 0.5 to 1 μm; 0.5 to 20 wt. % in the case of said surface roughness of 1 to 2 μm; 0.3 to 10 wt. % in the case of said surface roughness of 2 to 5 μm.

5 Claims, 2 Drawing Figures

CLEANING TAPE FOR MAGNETIC RECORDING APPARATUS

This application is a continuation-in-part of Ser. No. 274,740, June 18, 1981, abandoned.

BACKGROUND OF THE INVENTION

1. Field of the Invention

The present invention relates to a cleaning tape for cleaning a magnetic head of a magnetic recording apparatus.

2. Description of Prior Arts

During a use of a magnetic recording tape for a long time, a magnetic layer of the magnetic recording tape is partially peeled off by an abrasion of a magnetic head and the peeled dust is adhered on the surface of the magnetic head. When the peeled dust is adhered in a gap of the magnetic head, picture quality or tone quality is deteriorated. Further, a head clogging for interrupting recording and reproducing may be caused. In order to remove the dust adhered on the magnetic head, a cleaning tape has been used. The conventional cleaning tape has been mainly prepared by laminating Japanese paper or other paper on a substrate or by coating a mixture of an abrasive powder and a binder on a substrate.

When the former is used, a desired cleaning effect is not attained because the binder of the magnetic layer has remarkably high tackiness and paper fibers are dusted by repeating uses to adhere the fiber dust on the magnetic recording tape whereby a drop-out (defect of reproduced signal) is caused by defect of contact of the tape with the magnetic head.

When the latter is used for the cleaning, the surface of the magnetic head is damaged by using a hard abrasive for improving the cleaning effect whereas the cleaning effect is decreased by preventing the damage. It has been difficult to attain both of the increase of the cleaning effect and the prevention of damage on the surface of the magnetic head.

SUMMARY OF THE INVENTION

It is an object of the present invention to overcome the above-mentioned disadvantages of the conventional cleaning tape.

It is another object of the present invention to provide a cleaning tape for a magnetic recording apparatus which imparts remarkable cleaning effect with low wearing degree of a magnetic head.

The foregoing and other objects of the present invention have been attained by providing a cleaning tape for a magnetic recording apparatus which comprises a substrate coated with a cleaning layer comprising magnetic iron oxide powder as a main component and nonmagnetic abrasive powder having Moh's scale of hardness of at least 6 and a binder wherein said cleaning layer has a surface roughness of 0.5 to 5 $\mu$m and a ratio of said non-magnetic abrasive powder to said magnetic iron oxide powder of 0.3 to 40 wt.% and especially 3 to 40 wt.% in the case of said surface roughness of 0.5 to 1 $\mu$m; 0.5 to 20 wt.% in the case of said surface roughness of 1 to 2 $\mu$m; 0.3 to 10 wt.% in the case of said surface roughness of 2 to 5 $\mu$m.

DETAILED DESCRIPTION OF THE PREFERRED EMBODIMENTS

Figure 1:
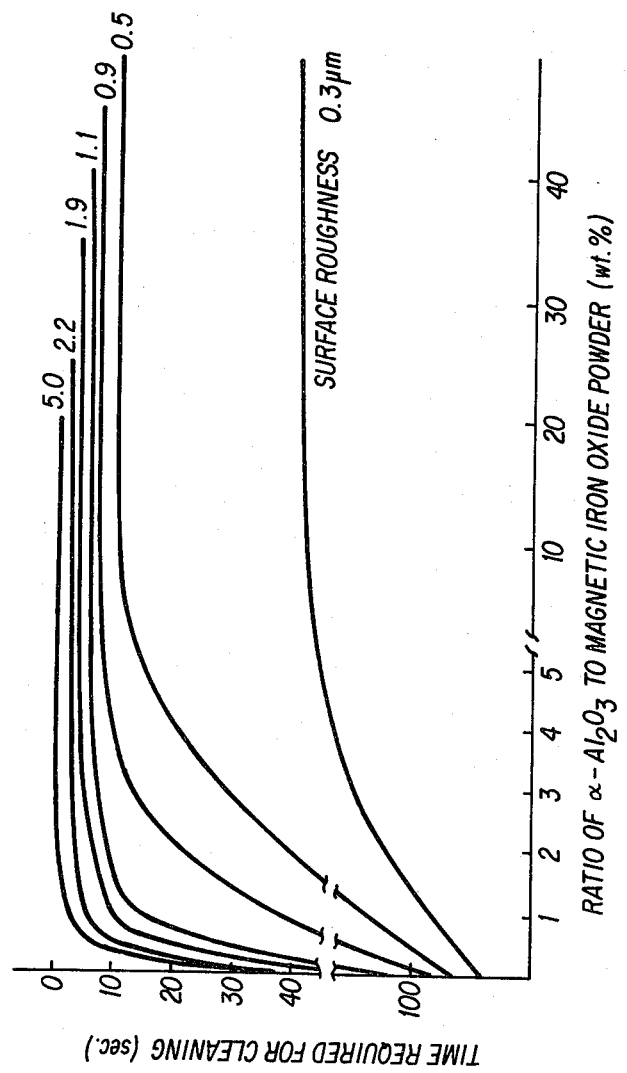
FIG. 1 is a graph showing relations of cleaning effects to ratios of the abrasive powder to the iron oxide powder in the parameter of surface roughnesses.

When the surface roughness is less than 0.5 $\mu$m, the surface is too smooth to remove a dust adhered on the magnetic head. Even though a large amount of the abrasive powder is incorporated, the cleaning effect is too low. Therefore, the cleaning effect is attained by providing the surface roughness of at least 0.5 $\mu$m. The cleaning effect is remarkably increased depending upon the increase of the surface roughness in the case of the constant ratio of the abrasive powder. On the contrary, the wearing degree of the magnetic head is increased depending upon the increase of the surface roughness. The cleaning effect is increased depending upon the increase of the ratio of the abrasive powder whereas the wearing degree of the magnetic head is increased, in the case of the constant ratio of the surface roughness.

The two factors of the surface roughness and the ratio of the abrasive powder which cause different effects to the wearing degree of the magnetic head and the cleaning effect are utilized and the two factors are set in desired ranges to improve the cleaning effect.

The feature of the present invention will be further illustrated. The cleaning tape of the present invention has a substrate coated with a cleaning layer comprising an iron oxide powder as a main component and an abrasive powder having Moh's scale of hardness of at least 6 in a surface roughness of 0.5 to 5 $\mu$m.

The ratio of the abrasive powder to the iron oxide powder is set in a range of 3 to 40 wt.% in the case of the surface roughness of 0.5 to 1 $\mu$m. The ratio of the abrasive powder is set in a range of 0.5 to 20 wt.% in the case of the surface roughness of 1 to 2 $\mu$m. The ratio of the abrasive powder is set in a range of 0.3 to 10 wt.% in the case of the surface roughness of 2 to 5 $\mu$m. The ratio of the abrasive powder to the iron oxide powder is controlled to be decreased depending upon the increase of the surface roughness of the cleaning layer.

In the case of the surface roughness of the cleaning layer of 0.5 to 1 $\mu$m, the cleaning effect is given by the synergistic effect of the abrasive powder. In order to impart a desired cleaning effect, a ratio of the abrasive powder of at least 3 wt.% is required. In view of the wearing degree of the magnetic head, the ratio of the abrasive powder is up to 40 wt.%.

In the case of the surface roughness of 1 to 2 $\mu$m, the cleaning effect caused by unevenness of the surface is relatively high. The ratio of the abrasive powder can be relatively low. The effective cleaning effect is imparted at a ratio of the abrasive powder of at least 0.5 wt.%. In view of the wearing degree of the magnetic head, the ratio of the abrasive powder is up to 20 wt.%.

In the case of the surface roughness of 2 to 5 $\mu$m, the cleaning effect caused by unevenness of the surface is remarkably high. The ratio of the abrasive powder can be low. If the ratio is too low, a dusting of the cleaning layer is caused. Therefore, the ratio of the abrasive powder is at least 0.3 wt.% in a practical application. In view of the head abrasion, the ratio of the abrasive powder should be up to 10 wt.% in this range.

When the ratio of the abrasive powder to the iron oxide powder and the surface roughness of the cleaning layer are controlled, the cleaning effect of the cleaning tape can be improved by synergistic effects of the addition of the abrasive powder and the surface roughness without damage of the magnetic head.

The cleaning layer is prepared by coating a coating composition comprising a binder, the abrasive powder, the iron oxide powder and a solvent with or without a curing agent. The binder can be the conventional binders used for the magnetic recording media. The curing agent can be isocyanates. The solvent can be the conventional solvents used for the magnetic recording media. The abrasive powders and the iron oxide powders are described in the following examples.

The present invention will be further illustrated by certain examples and references which are provided for purposes of illustration only and are not intended to be limiting the present invention.

EXAMPLE 1

$Fe_3O_4$: 400 wt. parts
Carbon: 20 wt. parts
Phenoxy resin (PKHH: UCC Co.) 50 wt. parts
Urethane elastomer: (Esten 5703: Goodrich Co.): 50 wt. parts
Lubricant 3 wt. parts
Methyl ethyl ketone: 600 wt. parts
Cyclohexanone: 200 wt. parts These components were admixed with alumina ($\alpha$-$Al_2O_3$:WA #8,000) at various ratios to prepare coating compositions for cleaning. An isocyanate curing agent was admixed to each composition. Each composition was coated on a polyethyleneterephthalate film in thickness of about 5 mm. Each coated tape was treated by a supercalender to give each desired surface roughness. Various cleaning tapes were prepared in various combinations of a surface roughness and a ratio of an abrasive powder to iron oxide powder.

Figure 2:
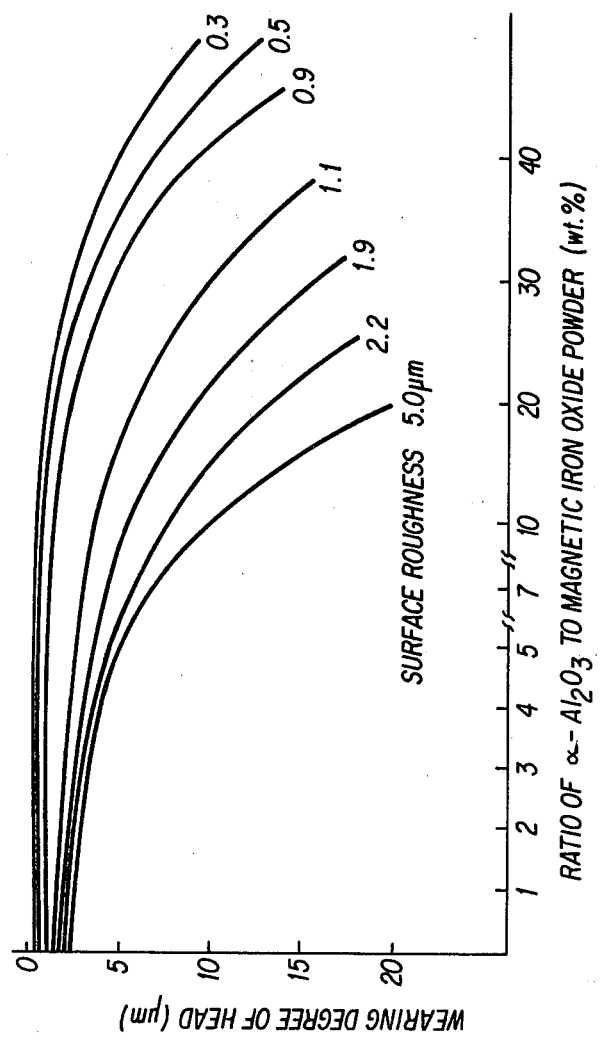
FIG. 2 is a graph showing relations of wearing degree to ratios of the abrasive powder to the iron oxide powder in the parameter of surface roughness.

FIGS. 1 and 2 show relations of cleaning effects and wearing degrees of a VTR head to ratios of the abrasive powder to iron oxide powder in parameters of surface roughness.

The cleaning effects are shown as times required for recovering each output under cleaning a clogged VTR head by each cleaning tape. As the cleaning effect, it is enough to recover the output within about 30 seconds preferably within about 15 seconds.

The wearing degrees of a VTR head are shown as abrasion after passing each cleaning tape having a length of 10 m for 100 times. As the wearing degree, it is enough to be up to about 10 $\mu$m/100 pass preferably up to about 5 $\mu$m/100 pass for the practical application.

The surface roughness is measured by using surface roughness meter model SE-3C pick-up DJ (Kosaka Kenkyusho) and is shown as a value for peaks.

As it is found from data, the cleaning effects are not so improved even though the ratio of the abrasive powder to iron oxide powder is increased in the case of the surface roughness of 0.3 $\mu$m. On the other hand, excellent cleaning effects are found when the ratio is at least 3 wt.% especially at least 5 wt.% in the case of a surface roughness of 0.5-1 $\mu$m; when the ratio is at least 0.5 wt.% preferably at least 1 wt.% in the case of a surface roughness of 1 to 2 $\mu$m; and when the ratio is at least 0.3 wt.% in the case of a surface roughness of 2 to 5 $\mu$m.

In view of the wearing of the VTR head, it is preferable to give a ratio of at least 40 wt.% preferably at least 30 wt.% in the case of a surface roughness of 0.5 to 1 $\mu$m; or a ratio of at least 20 wt.% preferably at least 7 wt.% in the case of a surface roughness of 1 to 2 $\mu$m; or a ratio of at least 10 wt.% preferably at least 5 wt.% in the case of a surface roughness of 2 to 5 $\mu$m.

EXAMPLE 2

In the coating composition for cleaning of Example 1, abrasive powders having Moh's scale of hardness of at least 6 such as $Cr_2O_3$, SiC, $TiO_2$ and $ZrO_2$ were respectively used instead of $\alpha$-$Al_2O_3$ and cleaning tapes were prepared and characteristics were tested. As results, similar results were found though wearing degrees of the VTR head were slightly different.

In Example 1, the surface roughness was varied by calendering. When the surface roughness was varied by selecting a condition for dispersing or a condition for coating in the preparation of each coating composition, similar results are found.

EXAMPLE 3

In the coating composition for cleaning of Example 1, other resins used for a conventional magnetic recording tape, such as vinyl chloride-vinyl acetate copolymers, polyesters and nitrocellulose were respectively used instead of the phenoxy resin and cleaning tapes were prepared and characteristics were tested. As results, effects of the surface roughness and the ratio of the abrasive powder to iron oxide powder to the wearing degree of the VTR head and the cleaning effect were substantially the same as those of Example 1.

In accordance with the process of Example 1 except eliminating the isocyanate curing agent, cleaning tapes were prepared with the plastic binder. The substantially same results were found except that the durability for imparting the cleaning effect was slightly inferior by a plastic deformation of the surface roughness of the cleaning layer.

EXAMPLE 4

In the coating composition for cleaning of Example 1, $\gamma$-$Fe_2O_3$ or Co-adsorbed $Fe_2O_3$ was used instead of $Fe_3O_4$ and cleaning tapes were prepared. The effects were substantially the same as those of Example 1.

In accordance with the cleaning tapes of the present invention, the surface roughness of the cleaning layer and the ratio of the abrasive powder to the magnetic powder were controlled whereby synergistic cleaning effects are imparted together with the reduction of wearing degree of the head.

I claim:

1. A cleaning tape for a magnetic recording apparatus which comprises a substrate coated with a cleaning layer comprising magnetic iron oxide powder as a main component and non-magnetic abrasive powder having Moh's scale of hardness of at least 6 and a binder wherein said cleaning layer has a surface roughness of 0.5 to 5 $\mu$m and a ratio of said non-magnetic abrasive powder to said magnetic iron oxide powder of 0.3 to 40 wt.% and especially 3 to 40 wt.% in the case of said surface roughness of 0.5 to 1 $\mu$m; 0.5 to 20 wt.% in the case of said surface roughness of 1 to 2 $\mu$m; 0.3 to 10 wt.% in the case of said surface roughness of 2 to 5 $\mu$m.

2. The cleaning tape according to claim 1 wherein said non-magnetic abrasive powder is alumina, chromium oxide, silicon carbide, titanium oxide or zirconium oxide.

3. The cleaning tape according to claim 1 wherein said magnetic iron oxide powder is $Fe_3O_4$, $\gamma$-$Fe_2O_3$ or Co-adsorbed $Fe_2O_3$.

4. The cleaning tape according to claim 1 wherein an isocyanate curing agent is used for curing said binder.

5. The cleaning tape according to claim 1 wherein said surface roughness is controlled by calendering.

* * * * *